US011397667B2

(12) United States Patent
Sekhar et al.

(10) Patent No.: US 11,397,667 B2
(45) Date of Patent: Jul. 26, 2022

(54) SOFTWARE TEST CASE SEQUENCING

(71) Applicant: Accenture Global Solutions Limited, Dublin (IE)

(72) Inventors: Mohan Sekhar, Bangalore (IN); Prabir GhoushalKumar, Bangalore (IN); Mahesh Venkataraman, Bangalore (IN); Sunder Ranganathan Nochilur, Bangalore (IN); Girish Dattatreya Kulkarni, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 169 days.

(21) Appl. No.: 16/796,282

(22) Filed: Feb. 20, 2020

(65) Prior Publication Data
US 2021/0263842 A1 Aug. 26, 2021

(51) Int. Cl.
*G06F 11/36* (2006.01)
*G06N 20/00* (2019.01)
*G06K 9/62* (2022.01)

(52) U.S. Cl.
CPC ...... *G06F 11/3692* (2013.01); *G06F 11/3684* (2013.01); *G06F 11/3688* (2013.01); *G06K 9/6218* (2013.01); *G06N 20/00* (2019.01)

(58) Field of Classification Search
CPC ............. G06F 11/3684; G06F 11/3688; G06F 11/3692; G06N 20/00; G06K 9/6218
See application file for complete search history.

(56) References Cited

U.S. PATENT DOCUMENTS

| | | | | |
|---|---|---|---|---|
| 9,104,815 B1 * | 8/2015 | Cohen | ................. | G06F 11/3672 |
| 9,134,961 B1 * | 9/2015 | Cohen | ....................... | G06F 8/30 |
| 9,317,404 B1 * | 4/2016 | Cohen | ................... | G06F 11/368 |
| 10,073,763 B1 * | 9/2018 | Raman | ................ | G06F 11/3688 |
| 10,338,993 B1 * | 7/2019 | Lekivetz | ............. | G06F 11/0709 |
| 10,545,855 B1 * | 1/2020 | Jayaswal | ............. | G06F 11/3608 |
| 10,678,678 B1 * | 6/2020 | Tsoukalas | ........... | G06F 11/3664 |
| 11,106,567 B2 * | 8/2021 | Hicks | ................... | G06F 11/3684 |
| 2012/0254660 A1 * | 10/2012 | He | ....................... | G06F 11/3688 714/28 |
| 2015/0113331 A1 * | 4/2015 | Bhattacharya | ...... | G06F 11/3688 714/38.1 |
| 2015/0378873 A1 * | 12/2015 | Prasad | ................ | G06F 11/3684 714/38.1 |
| 2016/0117239 A1 * | 4/2016 | Hamilton, II | ....... | G06F 11/3684 717/124 |
| 2017/0199811 A1 * | 7/2017 | Narayan | ................ | G06N 20/00 |

(Continued)

OTHER PUBLICATIONS

Sapna P.G. et al., Clustering Test Cases to achieve Effective Test Selection, Sep. 2010 (Year: 2010).*

*Primary Examiner* — Douglas M Slachta
(74) *Attorney, Agent, or Firm* — Plumsea Law Group, LLC (57) ABSTRACT

The disclosed system and method for software testing provide a strategy for testing new software functionalities in a sequence that detects defects according to a testing strategy designed to accomplish a predetermined objective. Providing a pre-testing stage generates test execution results for test cases designed to find defects related to new functionalities. Using machine learning clustering techniques to identify which test cases are similar to one another facilitates organizing test cases in a sequence appropriate for accomplishing a predetermined objective.

20 Claims, 3 Drawing Sheets

(56) References Cited

U.S. PATENT DOCUMENTS

| | | |
|---|---|---|
| 2018/0260309 A1* | 9/2018 | Simoni .............. G06F 11/3608 |
| 2019/0114417 A1* | 4/2019 | Subbarayan ........... G06N 20/00 |
| 2019/0196950 A1* | 6/2019 | Ranganathan ... G01R 31/31835 |
| 2020/0098161 A1* | 3/2020 | Smith ..................... G06F 17/16 |
| 2020/0233782 A1* | 7/2020 | Venkataraman .... G06F 11/3676 |
| 2021/0112178 A1* | 4/2021 | Perone ................... G06F 40/35 |
| 2021/0255946 A1* | 8/2021 | Levi ................... G06F 11/3688 |

\* cited by examiner

SOFTWARE TEST CASE SEQUENCING

TECHNICAL FIELD

The present disclosure generally relates to using machine learning to create software testing plans. More specifically, the present system and method generally relate to arranging a sequence of software test cases in an order that detects defects according to a testing strategy designed to accomplish a predetermined objective.

BACKGROUND

Software testing teams frequently face the challenge of executing test cases designed for a specific release or test cycle. Traditionally test cases are prioritized and sequenced manually based on the test lead's knowledge of the application or the inputs provided by a business analyst. Many times the selected sequence of test cases does not provide the feedback necessary to efficiently and comprehensively find defects.

Software testing generally involves executing two types of test cases:

Category 1: test cases designed to test existing functionalities; and

Category 2: test cases designed to test new functionalities. Category 1 test cases are easier to prioritize than Category 2 test cases. This is because the Category 1 test cases have already been used in other test cycles and contain test execution results (e.g., whether test cases failed/passed and/or contributed to finding a defect). This prior execution data can be used to prioritize this category of test cases.

Category 2 test cases do not have the benefit of prior test execution results. Accordingly, these test cases are generally prioritized based on the criticality of functionalities the test cases are designed to test. This type of prioritization can cause various issues. For example, some defects in new functionalities, particularly functionalities considered to be less critical, may not be identified at all. In another example, this type of prioritization does not help determine when to suspend testing of a specific feature/functionality and to shift focus to testing a different feature/functionality. In other words, without prior execution data, it is difficult to determine whether test cases should focus on finding more defects related to specific functionalities (more depth) or finding defects pertaining to a variety of different functionalities (broader coverage).

In yet another example, when a set of test cases (e.g., those meant to test noncritical functionalities) is positioned at the end of a sequence, these test cases are executed late in the test execution process. If a release were scheduled close to the end of the execution process, insufficient time may be available to resolve all of the defects identified by this set of test cases.

There is a need in the art for a system and method that addresses the shortcomings discussed above.

SUMMARY

The disclosed system and method for software testing solve the problems discussed above by providing a pre-testing stage to generate test execution results for test cases designed to find defects related to new functionalities and by using machine learning clustering techniques to identify which test cases are similar to one another. Using the pre-testing stage in combination with machine learning clustering techniques can provide test case information enabling the creation of a sequence of test cases designed to achieve a predetermined objective, such as a maximum defect yield per test case executed.

In one aspect, the disclosure provides a computer implemented method of testing software. The method may include obtaining a plurality of test cases. The method may include applying machine learning to group the plurality of test cases into clusters based on similarity. The method may include setting a first priority for each cluster. The method may include selecting one test case from each cluster to generate a first set of test cases arranged in a first sequence. The method may include executing the first set of test cases in the first sequence to obtain a first set of test results. The method may include analyzing the first set of test results. The method may include determining a second priority for each of the clusters based on the analysis of the first set of test results and the testing objective. The method may include generating a second set of test cases in a second sequence based on the second priority.

In yet another aspect, the disclosure provides a non-transitory computer readable medium storing software that may comprise instructions executable by one or more computers which, upon execution, cause the one or more computers to: (1) obtain a plurality of test cases; (2) apply machine learning to group the plurality of test cases into clusters based on similarity; (3) set a first priority for each cluster; (4) select one test case from each cluster to generate a first set of test cases arranged in a first sequence; (5) execute the first set of test cases in the first sequence to obtain a first set of test results; (6) analyze the first set of test results; (7) determine a second priority for each of the clusters based on the analysis of the first set of test results and the testing objective; and (8) generate a second set of test cases in a second sequence based on the second priority.

In yet another aspect, the disclosure provides a system for testing software, which comprises one or more computers and one or more storage devices storing instructions that may be operable, when executed by the one or more computers, to cause the one or more computers to: (1) obtain a plurality of test cases; (2) apply machine learning to group the plurality of test cases into clusters based on similarity; (3) set a first priority for each cluster; (4) select one test case from each cluster to generate a first set of test cases arranged in a first sequence; (5) execute the first set of test cases in the first sequence to obtain a first set of test results; (6) analyze the first set of test results; (7) determine a second priority for each of the clusters based on the analysis of the first set of test results and the testing objective; and (8) generate a second set of test cases in a second sequence based on the second priority.

In some embodiments, in one or more of the above-mentioned method, non-transitory computer readable medium, and system, the second set includes test cases from clusters having a second priority that is higher than the second priority of other clusters.

In some embodiments, in one or more of the above-mentioned method, non-transitory computer readable medium, and system, applying machine learning to group the plurality of test cases into clusters based on similarity includes comparing unigrams and bigrams created for each test case of the plurality of test cases to determine a similarity based on unigram and bigram, $S_{UB}$, for each pairing of test cases in the plurality of test cases.

In some embodiments, in one or more of the above-mentioned method, non-transitory computer readable medium, and system, applying machine learning to group the plurality of test cases into clusters based on similarity includes finding the semantic similarity for each pairing of test cases in the plurality of test cases.

In some embodiments, in one or more of the above-mentioned method, non-transitory computer readable medium, and system, finding the semantic similarity includes using both Latent Semantic Indexing (LSI) and Word Mover Distance (WMD) to determine a similarity based on LSI, $S_{LSI}$, and similarity based on WMD, $S_{WMD}$, for each pairing of test cases in the plurality of test cases.

In some embodiments, in one or more of the above-mentioned method, non-transitory computer readable medium, and system, applying machine learning to group the plurality of test cases into clusters based on similarity includes calculating a final similarity, $S_{FINAL}$, based on one or more of $S_{UB}$, $S_{LSI}$, and $S_{WMD}$ for each pairing of test cases and using $S_{FINAL}$ to define clusters.

In some embodiments, in one or more of the above-mentioned method, non-transitory computer readable medium, and system, the predetermined objective is associated with a strategy of prioritizing test cases that have a higher probability to fail are prioritized first.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

The disclosed system and method for software testing may include using a pre-testing stage and clustering techniques to provide information that can be used to strategically place test cases in an order that accomplishes a predetermined objective (e.g., testing a single functionality or a variety of functionalities).

The test cases have text descriptions summarizing the purpose, process, and expected result of test cases. It is understood that these text descriptions may be referred to herein as "text of test cases," "test case documents," and "test cases."

Figure 1:
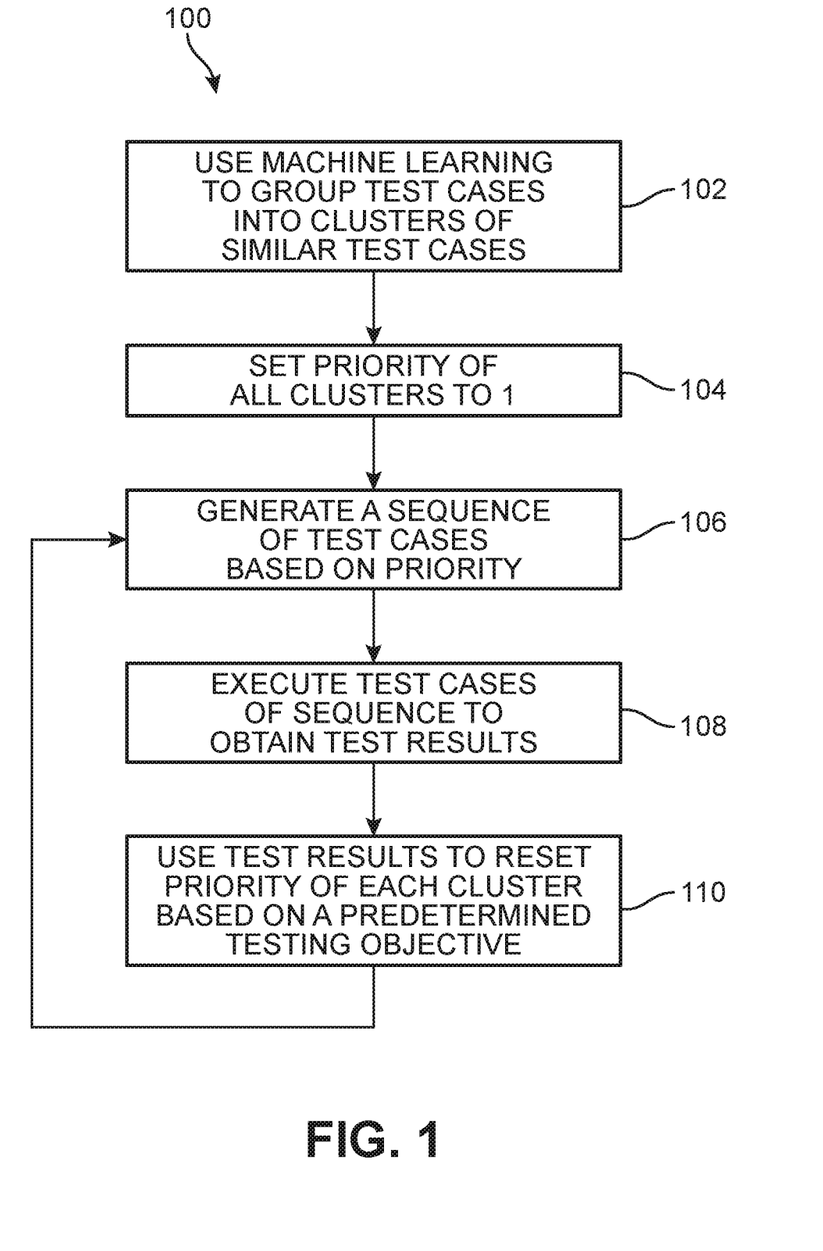
FIG. 1 shows a flowchart of a computer implemented method of software testing, according to an embodiment.

Software development for large scale projects often involve multiple teams of people dedicated to writing test cases for the newly developed software. In some cases, the people on these teams may reside in various locations throughout the World. With so many people creating test cases in isolation from one another, the resulting test cases may be identical or at least overlap in some way. For some projects, hundreds of test cases are created. As explained below, when a testing strategy is meant to flush out issues with a particular functionality, the identical or similar test cases may be useful. However, when a testing strategy is meant to test a wide variety of functionalities, it is not beneficial to use identical or similar test cases. Thus, grouping the test cases into clusters of similar cases can facilitate strategically placing the test cases into an order appropriate for a predetermined objective. To provide clusters of similar cases, the disclosed computer implemented method may include grouping test cases into clusters. For example, as shown in FIG. 1, a computer implemented method of software testing 100 (or method 100), according to an embodiment, includes using machine learning to group test cases into clusters of similar test cases (operation 102). Details of this operation are discussed in more detail below.

In some embodiments, the system and method for software testing may include test cases related to new functionalities. The test cases related to new functionalities have not yet been executed to test software. Accordingly, no historical test results exist to help identify the capabilities of the test cases. The present system and method provide a way of identifying the capabilities of test cases designed for new functionalities by using a pre-testing stage in which the results of executing a set of tests serves as a starting point. During the pre-testing stage, clusters of test cases are each assigned an equal priority (e.g., 1). For example, method 100 includes setting a priority of all the clusters to 1 (operation 104). As discussed in more detail below, a recommendation (or sequencing) engine may select a test case from each cluster randomly to create a set of sample test cases. For example, method 100 includes generating a sequence of test cases based on a priority (operation 106). This set of test cases included in the sequence may be executed during the pre-testing stage to create execution history (i.e., test results) that can be used to strategically order test cases in future testing cycles of a testing stage. For example, method 100 includes executing test cases of the sequence to obtain test results (operation 108).

The results from the pre-testing stage may show that certain test cases pass, and other test cases fail (e.g., thus allowing detection and/or identification of defects). Similar test cases have a high probability to fail or pass together, as the similarity in the test cases indicates that these test cases are meant to focus on the same functionalities and find similar defects. Thus, if one test case passes after execution, it is highly probable that test cases belonging to the same cluster will also pass. This high probability is used to predict the likelihood that a test within the same cluster will pass or fail during execution. In other words, if test case 1 fails during the pre-testing stage, the system will predict that all test cases belonging to the same cluster as test case 1 have a high probability of also failing.

Finding similar test cases and grouping these test cases together can help with selecting which test cases to include in a sequence of test cases. For example, in a pool of 100 test cases, 10 test cases may have the purpose of testing whether a login page works. If a sequence of tests is meant to find every defect with the login page, then all 10 of the test cases related to the login page may be positioned early in the sequence. However, if a sequence of tests is meant to find a wide variety of defects, only one or two of the 10 test cases may be placed early in the sequence of tests.

The testing stage after the pre-testing stage may include one or more predetermined objectives, such as a maximum defect yield per test case executed. For example, in some embodiments, the predetermined objective(s) may include one of the following:

A. Finding defects for the same functionality (e.g., functionalities related to test cases that failed). For this objective, test cases that have a higher probability to fail are prioritized first. In this case, for clusters where the first test case failed, the priority is increased by a factor; and B. Finding defects of different types. Test cases having potentially distinct types of defects are prioritized first. In this case, for clusters where the first test case failed, the priority is decreased by factor.

Method 100 includes using test results (or an analysis of test results) to reset the priority of each cluster based on a predetermined testing objective (operation 110). For example, test case 1 may fail during the pre-testing stage, and this result of failing may be used to predict that test cases of the same cluster are also likely to fail. Similarly, test case 2 may pass during the pre-testing stage, and this result of passing may be used to predict that test cases of the same cluster are also likely to pass. In this example, if the predetermined objective is objective A, then test case 1 and the test cases in its cluster will be prioritized first (e.g., will have a priority of 1) and test case 2 and the test cases in its cluster will be de-prioritized/prioritized second (e.g., will have a priority of 2 or greater). If the predetermined objective is objective B, then test case 1 and the test cases in its cluster will be prioritized second (e.g., will have a priority of 2) and test case 2 and the test cases in its cluster will be prioritized first (e.g., will have a priority of 1). It should be appreciated that multiple levels of priorities could be used to arrange clusters for testing in the event that multiple objectives are defined. It should also be appreciated that in the case multiple objectives are defined, these objectives could be ranked, and an appropriate number of priorities defined to sequence clusters according to the ranked objectives.

After the pre-testing stage, newly reset priorities can be used to repeat generating a sequence of test cases in subsequent cycles of a testing stage. For example, as shown by the arrow between operation 110 and operation 106, the reset priorities may be used to generate a new sequence of test cases based on the reset priority. Once revised priorities have been assigned to the clusters, one test case from each of cluster in which the priority is highest (e.g., a priority of 1) may be selected to create a new sequence of test cases. In this way, each cycle may inform the next cycle. The cycle of generating sequences, executing sequences, and resetting priorities based on test results can be repeated a predetermined number of times. For example, the cycle may be repeated until all of the test cases have been executed. Each testing cycle can detect and/or identify one or more defects. These defects may be provided as output from the execution of each test case, the execution of all test cases in a single cycle, and/or the execution of all of the test cases. The defects identified during software testing in the manner discussed herein may be fixed, thereby improving the quality and reliability of the software. In some embodiments, the disclosed system and method may be implemented into an automated testing platform (e.g., U.S. Pat. No. 10,073,763 to Venkata Raman et al., issued Sep. 11, 2018, which is hereby incorporated by reference in its entirety).

Figure 2:
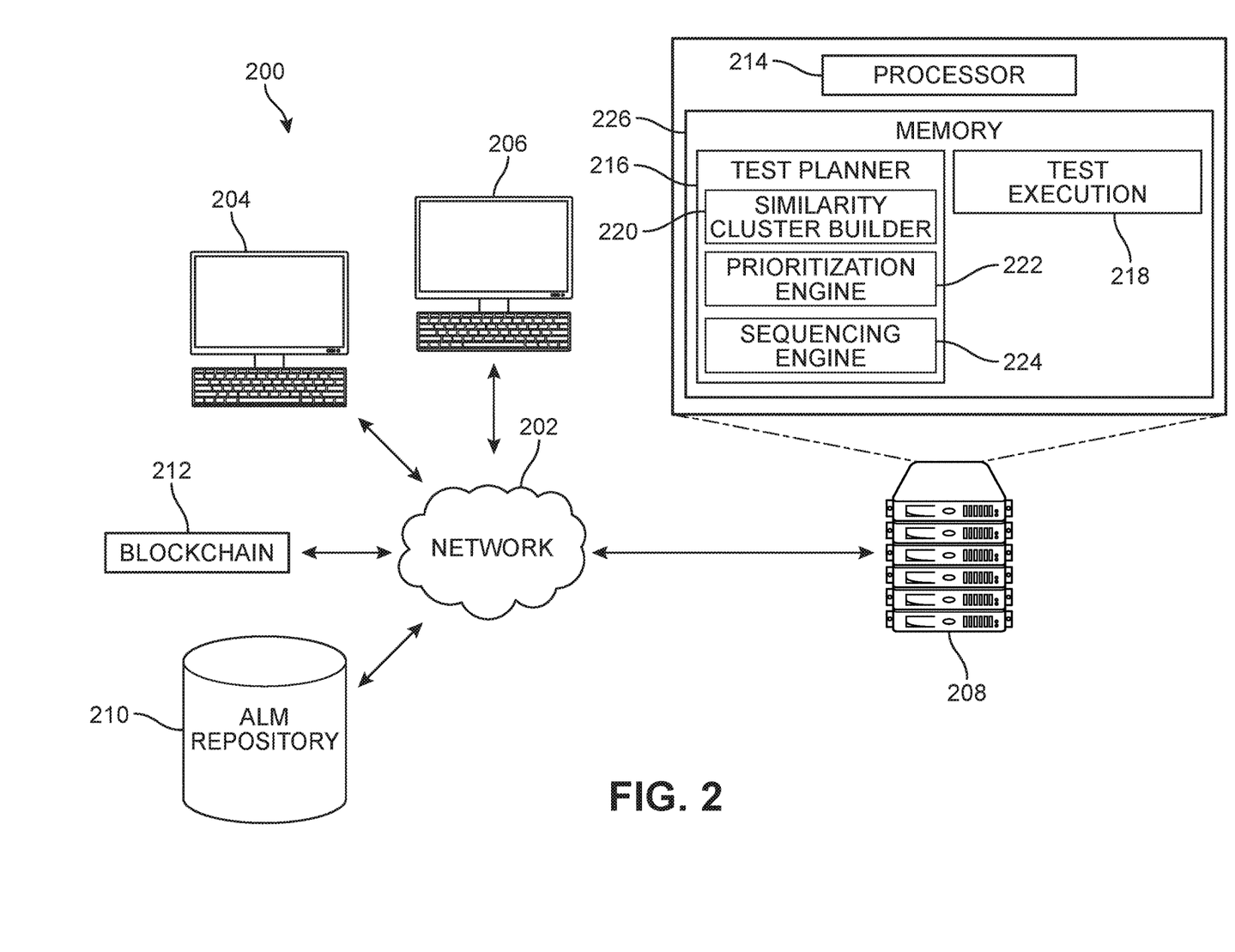
FIG. 2 shows a schematic diagram of a system for software testing according to an embodiment.

FIG. 2 shows a schematic diagram of a system for software testing 200 (or system 200), according to an embodiment. The disclosed system for software testing may include a plurality of components capable of performing the disclosed method (e.g., method 100). For example, system 200 includes a first user device 204, a second user device 206, a computing system 208, an application lifecycle management ("ALM") repository 210, and a blockchain 212. The components of system 200 can communicate with each other through a network 202. For example, user device 204 may retrieve information from blockchain 212 via network 220, In some embodiments, network 220 may be a wide area network ("WAN"), e.g., the Internet. In other embodiments, network 220 may be a local area network ("LAN").

While FIG. 2 shows two user devices, it is understood that one or more user devices may be used. For example, in some embodiments, the system may include three user devices. In another example, in some embodiments, 10 user devices may be used. The users may be testers using different devices. In some embodiments, the user devices may be computing devices used by a user. For example, first user device 204 and/or second user device 206 may include tablet computers. In other examples, first user device 204 and/or second user device 206 may be a smart phone, a laptop computer, a desktop computer, or another type of computing device. The user devices may be used for inputting, processing, and displaying information.

As shown in FIG. 2, in some embodiments, a test planner 216 and test execution engine 218 may be hosted in a computing system 208, Computing system 208 includes a processor 214 and a memory 226. Test planner 216 includes a similarity cluster builder 220, a prioritization engine 222, and a sequencing engine 224. Processor 214 may include a single device processor located on a single device, or it may include multiple device processors located on one or more physical devices. Memory 226 may include any type of storage, which may be physically located on one physical device, or on multiple physical devices. In some cases, computing system 208 may comprise one or more servers that are used to host the test planner and text execution component.

In some embodiments, ALM repository 210 may be part of an ALM system used to test software, ALM repository 210 may be used to store test case information, such as test case descriptions, test results, test case execution status, and/or test case sequences. ALM repository 210 may be updated with all aspects of testing in real time.

In some embodiments, blockchain 212 may include a blockchain structure appropriate for maintaining test case information. Blockchain 212 may be automatically synchronized with ALM repository 210. In this way, users (e.g., testers) may utilize user devices to access testing information from blockchain 212. This means that users without access to the ALM repository may securely retrieve testing information. Additionally, by synchronizing blockchain 212 with ALM repository 210, users can access the test information in real time from blockchain 212 without having to wait on a slow ALM server.

Figure 3:
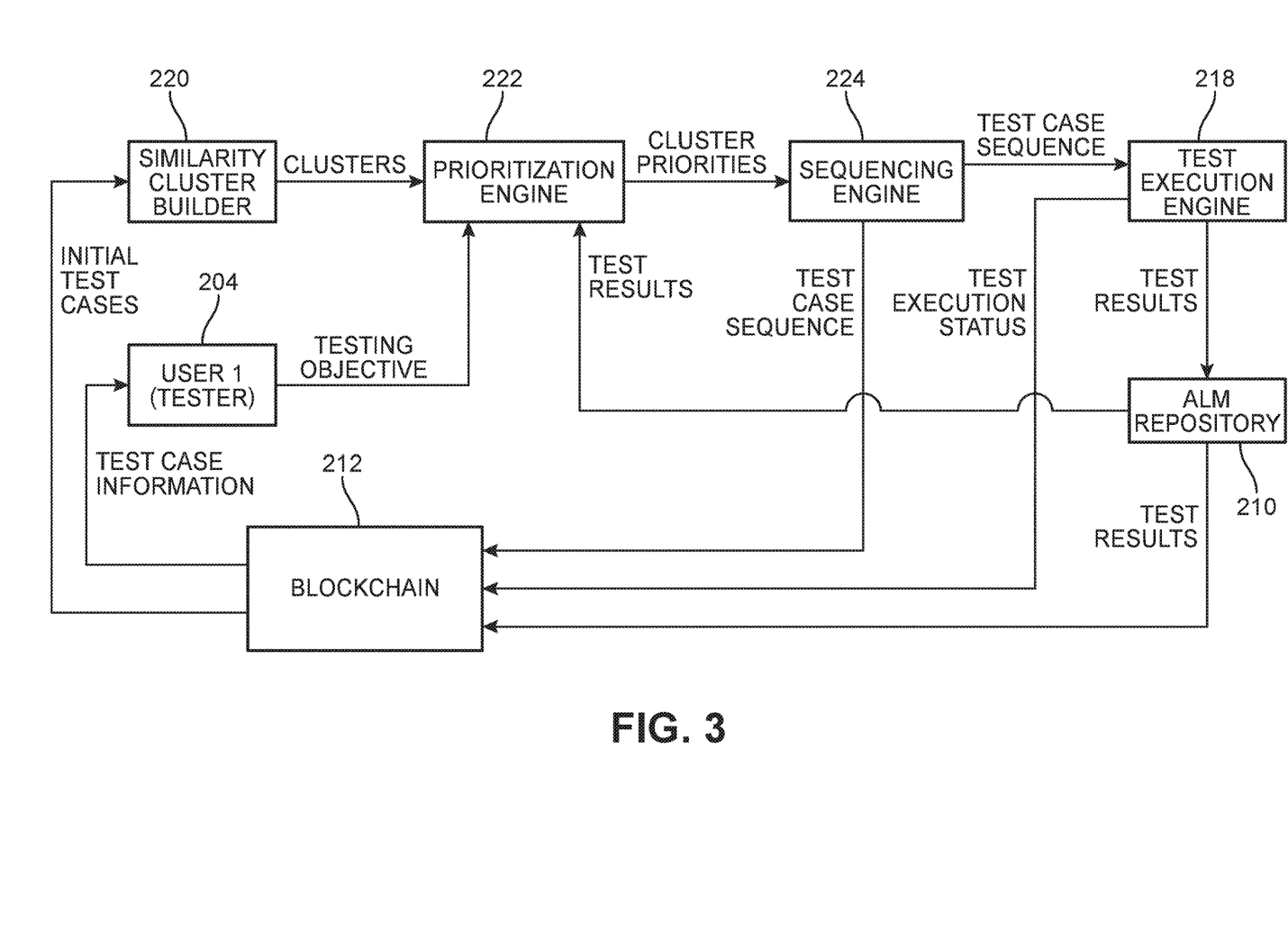
FIG. 3 shows a flow of information from components of the system, according to an embodiment.

FIG. 3 shows the flow of information from components of system 200, according to an embodiment. The initial test cases, which may be obtained from many different sources (e.g., test writers in various locations), may be input into similarity cluster builder 220. As shown in FIG. 3, the initial test cases may be maintained in and retrieved from blockchain 212. In some embodiments, test writers or other users may save test cases in blockchain 212.

As exemplified by method 100, the method may include using machine learning to group test cases into clusters of similar test cases. In some embodiments, as shown in FIG. 3, the similarity cluster builder may use machine learning to group the initial test cases into clusters of similar test cases. For example, using machine learning to group test cases may include clustering test cases based on one or both of text similarity and semantic similarity. Basing clustering on both types of similarities can provide more comprehensive results, as text similarity by itself may not capture test cases that use different language or short forms of words to capture the same meaning. Test cases may be created by teams that are spread out across geographies and team members tend to have varied vocabulary and short forms for the same word. For example, programs may be written as programs, prog, prog., progs, or progs. Comparing the text of a test case including "programs" and the test of a test case including "progs" for text similarity may not result in finding any similarity between "programs" and "progs." However, comparing the text of these test cases to find semantic similarity may result in finding a similarity between "programs" and "progs." Accordingly, semantic similarity can enhance the clustering process.

In some embodiments, the disclosed method may include converting the text of test case documents into word embeddings (e.g., using word2vec) to put the text into a format more suitable for machine learning. As discussed below, these word embeddings may be used/analyzed to determine the similarity between pairs of test cases.

The disclosed method may include using machine learning to compare the text of test cases for text similarity by comparing n-grams created from the text of test cases. Some embodiments may include generating n-grams (e.g., unigrams and/or bigrams) from the word embeddings of each test case. As discussed in more detail below, the generated n-grams from each test case document may be compared with one another to generate a similarity score, $S_{UB}$, for a pairing of each test case document.

Comparing unigrams helps find overall text similarity. Comparing bigrams helps find similarity in phrases and/or filters out situations where single words in the text of two test cases are similar, but the single words are used in phrases that have a different meaning. For example, comparing unigrams may result in identifying that two test cases have a certain degree (e.g., percentage ranging from 0% to 100% or score ranging from 0.1 to 1) of text similarity because the two test cases both include the word "respond." However, comparing bigrams in the same two cases may result in a smaller degree of text similarity because "respond" is next to "not" in one of the two cases and not the other. Unigrams and bigrams can also be effective in handling acronyms, which can be prevalent in software test cases.

The disclosed method may include comparing the test of test cases for semantic similarity (e.g., percentage ranging from 0% to 100% or score ranging from 0.1 to 1) by using one or both of Latent Semantic Indexing ("LSI") and/or Word Mover Distance ("WMD"). These two techniques work well for comparing the semantic similarity of test cases. As discussed in more detail below, these two techniques may be combined with comparing unigrams and bigrams of test cases.

In LSI, each test case description is treated as a document. LSI is a machine learning tool that compares documents to one another to find similarity in concepts rather than terms. In other words, LSI considers synonyms to be similar during comparison. By itself, LSI can accurately score test cases that are highly similar (i.e., above 95%). However, scores generated by LSI lose accuracy as the number of acronyms increase. Thus, combining LSI with the technique of WMD in the manner discussed below can enhance accuracy in grouping test cases into clusters of similar test cases.

In WMD, each test case description is also treated as a document. WMD is a machine learning tool that uses normalized Bag-of-Words and word embeddings to calculate the distance between documents. When Test cases are written by large teams it is possible that two test cases are related to the same functionality but have very few words in common. WMD is effective in identifying similarity with high accuracy when the words used in the individual test cases are different.

In some embodiments, using machine learning to group test cases into clusters of similar test cases may include combining results from analyzing for text similarity and analyzing for semantic similarity. For example, for a repository of test cases, similarities scores may be calculated in the following manner in which, $S_{UB}$=similarity based on unigram & bigram, $S_{LSI}$=similarity based on LSI, $S_{WMD}$=similarity based on WMD, and $S_{FINAL}$=final similarity used to define clusters, If $S_{UB}$ greater than 97% then overall similarity score is set to $S_{UB}$, then the final similarity score is $S_{FINAL}=S_{UB}$.

If $S_{UB}$ between 90% and 96.9999% then final similarity score is calculated as:

$S_{FINAL}=(0.8\times S_{UB})+(0.1\times S_{LSI})+(0.1\times S_{WMD})$

If $S_{UB}$ between 80% and 89.9999% then final similarity score is calculated as:

$S_{FINAL}=(0.6\times S_{UB})+(0.2+S_{LSI})+(0.2\times S_{WMD})$

If $S_{UB}$ between 50% and 79.9999% then final similarity score is calculated as: f $S_{FINAL}=(0.5\times S_{UB})+(0.25\times S_{LSI})+(0.25+S_{WMD})$ If $S_{UB}$ between below 50% then overall similarity score is calculated as follows $S_{FINAL}=(0.2\times S_{UB})+(0.4\times S_{LSI})+(0.4\times S_{WMD})$ In some embodiments, grouping test cases into clusters of similar test cases may include comparing unigrams and bigrams from each test case with every other test case in a group of test cases (e.g., test cases designed for particular application and/or test cases stored in a repository) to determine a degree of similarity, $S_{UB}$, between each pairing of test cases based on unigrams and bigrams. For example, if a group of test cases includes test case 1, test case 2, test case 3, and test case 4, the pairings would be (1) test case 1 and test case 2; (2) test case 1 and test case 3; (3) test case 1 and test case 4; (4) test case 2 and test case 3; (5) test case 2 and test case 4; (6) test case 3 and test case 4. This way, each test case is compared to every other test case in a group. In some embodiments, grouping test cases into clusters of similar test cases may include using LSI to determine a degree of similarity, $S_{LSI}$, between each pairing of test cases based on LSI. In some embodiments, grouping test cases into clusters of similar test cases may include using WMD to determine a degree of similarity, $S_{WMD}$, between each pairing of test cases based on WMD. The similarity scores found using unigrams/bigrams, LSI, and WMD may be combined using the above equations to determine a final similarity score $S_{Final}$, which may then be used for clustering test cases into groups of similar test cases. For example, threshold final similarity scores may be used to group similar test cases together into clusters.

As shown in FIG. 3, the resulting clusters may be input into prioritization engine 222, which determines cluster priorities. For example, during the pre-testing stage prioritization engine 222 sets the priority of all clusters to a first priority, e.g., a priority of 1. In another example, during other stages of testing, prioritization engine 222 analyzes test results, and uses this analysis along with a testing objective (from user device 204) to determine and assign a priority to each cluster. FIG. 3 shows only one user device 204 for simplicity. However, it is understood that multiple user devices may control aspects of testing (e.g., input a testing objective) and/or retrieve information from the blockchain. After prioritization engine 222 assigns priorities, the cluster priorities may then be input into sequencing engine 224, which selects one test case from each cluster where the priority is highest to create a test case sequence. The test case sequence is then sent blockchain 212 to make the sequence available for retrieval and to test execution engine 218, where the tests are executed. Test results from test execution engine 218 are sent to ALM repository 210 and blockchain 212. Test execution status is also sent from test execution engine 218 to blockchain 218 to make the status available for retrieval. Users may retrieve test case information from blockchain 212.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computer implemented method of testing software, comprising:
   obtaining a plurality of test cases;
   applying machine learning to group the plurality of test cases into clusters based on similarity;
   setting a first priority for each cluster such that each cluster has the same priority;
   randomly selecting one test case from each cluster to generate a first set of test cases arranged in a first sequence based on the random selection;
   conducting a pre-testing stage including executing the first set of test cases in the first sequence to obtain a first set of test results;
   obtaining a predetermined testing objective;
   analyzing the first set of test results to identify one or more test cases that failed during the pre-testing stage;
   determining a second priority for each of the clusters based on the analysis of the first set of test results, including whether the test case from the respective cluster failed during the pre-testing stage, and the testing objective; and
   generating a second set of test cases in a second sequence based on the second priority.

2. The computer implemented method of claim 1, wherein the second set includes test cases from clusters having a second priority that is higher than the second priority of other clusters.

3. The computer implemented method of claim 1, wherein applying machine learning to group the plurality of test cases into clusters based on similarity includes comparing unigrams and bigrams created for each test case of the plurality of test cases to determine a similarity based on unigram and bigram, $S_{UB}$, for each pairing of test cases in the plurality of test cases.

4. The computer implemented method of claim 3, wherein applying machine learning to group the plurality of test cases into clusters based on similarity includes finding the semantic similarity for each pairing of test cases in the plurality of test cases.

5. The computer implemented method of claim 4, wherein finding the semantic similarity includes using both Latent Semantic Indexing (LSI) and Word Mover Distance (WMD) to determine a similarity based on LSI, $S_{LSI}$, and similarity based on WMD, $S_{WMD}$, for each pairing of test cases in the plurality of test cases and applying machine learning to group the plurality of test cases into clusters based on similarity includes calculating a final similarity, $S_{FINAL}$, based on one or more of $S_{UB}$, $S_{LSI}$, and $S_{WMD}$ for each pairing of test cases and using $S_{FINAL}$ to define clusters.

6. The computer implemented method of claim 1, wherein the predetermined objective is to test software to find different types of defects and the second priority determined for the clusters containing test cases that failed during the pre-testing stage is lower than the second priority determined for other clusters.

7. The computer implemented method of claim 1, wherein the predetermined objective is to test software to find defects for the same functionality and the second priority determined for the clusters containing test cases that failed during the pre-testing stage is higher than the second priority determined for other clusters.

8. A non-transitory computer-readable medium storing software comprising instructions executable by one or more computers which, upon such execution, cause the one or more computers to:
   obtain a plurality of test cases;
   apply machine learning to group the plurality of test cases into clusters based on similarity;
   set a first priority for each cluster such that each cluster has the same priority;
   randomly selecting one test case from each cluster to generate a first set of test cases arranged in a first sequence based on the random selection;
   conduct a pre-testing stage including executing the first set of test cases in the first sequence to obtain a first set of test results;
   obtain a predetermined testing objective;

analyze the first set of test results to identify one or more test cases that failed during the pre-testing stage;

determine a second priority for each of the clusters based on the analysis of the first set of test results, including whether the test case from the respective cluster failed during the pre-testing stage, and the testing objective; and generate a second set of test cases in a second sequence based on the second priority.

9. The non-transitory computer-readable medium storing software of claim 8, wherein the second set includes test cases from clusters having a second priority that is higher than the second priority of other clusters.

10. The non-transitory computer-readable medium storing software of claim 8, wherein applying machine learning to group the plurality of test cases into clusters based on similarity includes comparing unigrams and bigrams created for each test case of the plurality of test cases to determine a similarity based on unigram and bigram, $S_{UB}$, for each pairing of test cases in the plurality of test cases.

11. The non-transitory computer-readable medium storing software of claim 10, wherein applying machine learning to group the plurality of test cases into clusters based on similarity includes finding the semantic similarity for each pairing of test cases in the plurality of test cases.

12. The non-transitory computer-readable medium storing software of claim 11, wherein finding the semantic similarity includes using both Latent Semantic Indexing (LSI) and Word Mover Distance (WMD) to determine a similarity based on LSI, $S_{LSI}$, and similarity based on WMD, $S_{WMD}$, for each pairing of test cases in the plurality of test cases and applying machine learning to group the plurality of test cases into clusters based on similarity includes calculating a final similarity, $S_{FINAL}$, based on one or more of $S_{UB}$, $S_{LSI}$, and $S_{WMD}$ for each pairing of test cases and using $S_{FINAL}$ to define clusters.

13. The non-transitory computer-readable medium storing software of claim 8, wherein the predetermined objective is to test software to find different types of defects and the second priority determined for the clusters containing test cases that failed during the pre-testing stage is lower than the second priority determined for other clusters.

14. The non-transitory computer-readable medium storing software of claim 8, wherein the predetermined objective is to test software to find defects for the same functionality and the second priority determined for the clusters containing test cases that failed during the pre-testing stage is higher than the second priority determined for other clusters.

15. A system for testing software, comprising:
one or more computers and one or more storage devices storing instructions that are operable, when executed by the one or more computers, to cause the one or more computers to:
obtain a plurality of test cases;
apply machine learning to group the plurality of test cases into clusters based on similarity;
set a first priority for each cluster such that each cluster has the same priority;
randomly selecting one test case from each cluster to generate a first set of test cases arranged in a first sequence based on the random selection;
conduct a pre-testing stage including executing the first set of test cases in the first sequence to obtain a first set of test results;
obtain a predetermined testing objective;
analyze the first set of test results to identify one or more test cases that failed during the pre-testing stage;
determine a second priority for each of the clusters based on the analysis of the first set of test results, including whether the test case from the respective cluster failed during the pre-testing stage, and the testing objective; and
generate a second set of test cases in a second sequence based on the second priority.

16. The system of claim 15, wherein the second set includes test cases from clusters having a second priority that is higher than the second priority of other clusters.

17. The system of claim 15, wherein applying machine learning to group the plurality of test cases into clusters based on similarity includes comparing unigrams and bigrams created for each test case of the plurality of test cases to determine a similarity based on unigram and bigram, $S_{UB}$, for each pairing of test cases in the plurality of test cases.

18. The system of claim 17, wherein applying machine learning to group the plurality of test cases into clusters based on similarity includes finding the semantic similarity for each pairing of test cases in the plurality of test cases.

19. The system of claim 18, wherein the predetermined objective is to test software to find different types of defects and the second priority determined for the clusters containing test cases that failed during the pre-testing stage is lower than the second priority determined for other clusters.

20. The system of claim 19, wherein the predetermined objective is to test software to find defects for the same functionality and the second priority determined for the clusters containing test cases that failed during the pre-testing stage is higher than the second priority determined for other clusters.

* * * * *